United States Patent
Chu et al.

(10) Patent No.: US 8,218,435 B2
(45) Date of Patent: Jul. 10, 2012

(54) RESOURCE IDENTIFIER BASED ACCESS CONTROL IN AN ENTERPRISE NETWORK

(75) Inventors: Christopher Chu, Lakewood, CO (US); Ronald S. Rozensky, Bradenton, FL (US); Robert Rhea Seibel, Waretown, NJ (US); Mukund Sundararajan, Sayreville, NJ (US)

(73) Assignee: Avaya Inc., Basking Ridge, NJ (US)

( * ) Notice: Subject to any disclaimer, the term of this patent is extended or adjusted under 35 U.S.C. 154(b) by 1333 days.

(21) Appl. No.: 11/535,118

(22) Filed: Sep. 26, 2006

(65) Prior Publication Data

US 2008/0077697 A1 Mar. 27, 2008

(51) Int. Cl.
*H04J 1/16* (2006.01)
(52) U.S. Cl. .................. 370/230; 709/229; 726/27
(58) Field of Classification Search .......... 370/229–235; 709/229; 726/27
See application file for complete search history.

(56) References Cited

U.S. PATENT DOCUMENTS

| | | | |
|---|---|---|---|
| 6,513,129 B1 | 1/2003 | Tentij et al. | |
| 6,898,710 B1 | 5/2005 | Aull | |
| 6,938,171 B1* | 8/2005 | Isomichi et al. | 726/12 |
| 7,117,529 B1* | 10/2006 | O'Donnell et al. | 726/6 |
| 2003/0236876 A1 | 12/2003 | Curtin et al. | |
| 2004/0078325 A1* | 4/2004 | O'Connor | 705/39 |
| 2004/0088404 A1 | 5/2004 | Aggarwal | |
| 2005/0010808 A1* | 1/2005 | Wixson et al. | 713/200 |
| 2005/0060328 A1 | 3/2005 | Suhonen et al. | |
| 2005/0114701 A1 | 5/2005 | Atkins et al. | |
| 2005/0268345 A1* | 12/2005 | Harrison et al. | 726/27 |
| 2005/0278547 A1 | 12/2005 | Hyndman et al. | |
| 2006/0002401 A1 | 1/2006 | Mukherjee et al. | |
| 2006/0021031 A1* | 1/2006 | Leahy et al. | 726/22 |
| 2006/0029032 A1 | 2/2006 | Allan et al. | |
| 2006/0069957 A1 | 3/2006 | Ganesh et al. | |
| 2006/0143702 A1 | 6/2006 | Hisada et al. | |
| 2006/0233180 A1 | 10/2006 | Serghi et al. | |
| 2006/0256800 A1* | 11/2006 | Harrington et al. | 370/401 |
| 2007/0028118 A1* | 2/2007 | Brown et al. | 713/185 |
| 2007/0033139 A1* | 2/2007 | Handler | 705/44 |
| 2009/0024532 A1* | 1/2009 | Chien-Ming | 705/64 |

FOREIGN PATENT DOCUMENTS

GB 2433181 A 6/2007
WO 2005032041 A1 4/2005

OTHER PUBLICATIONS

Juniper Networks Advanced Feature Set, Data Sheet, 2 pages, Jul. 2005.
Juniper Networks Secure Access 700, Data Sheet, 4 pages, Nov. 2005.
Juniper Networks Secure Access 2000, Data Sheet, 4 pages, Nov. 2005.

(Continued)

*Primary Examiner* — Ricky Ngo
*Assistant Examiner* — Kan Yuen

(57) ABSTRACT

An entry in an authentication database of an enterprise network is activated responsive to generation of an alarm by a corresponding product that is part of a set of internal resources of the enterprise network. A dynamic URL or other resource identifier based on the activated entry is supplied to an external service provider associated with the product. The external service provider is granted access to the product responsive to submission of the resource identifier by the service provider.

14 Claims, 2 Drawing Sheets

OTHER PUBLICATIONS

Juniper Networks Secure Access 4000, Data Sheet, 4 pages, Nov. 2005.
Juniper Networks Secure Access 6000, Data Sheet, 4 pages, Nov. 2005.
Juniper Networks Secure Access 6000 SP, Data Sheet, 4 pages, Nov. 2005.
Aventail EX-2500, EX-1500, and EX-750, Data Sheet, pp. 1-4, 2005.
Permeo Base5, Datasheet, 2 pages, 2005.
Liberty Alliance Project, "Liberty ID-FF Architecture Overview," Version: 1.2-errata-v1.0, pp. 1-44, 2005.
U.S. Appl. No. 11/294,961, filed Dec. 6, 2005, A.W. Raphael et al., "Secure Gateway with Alarm Manager and Support for Inbound Federated Identity."
U.S. Appl. No. 11/444,861, filed Jun. 1, 2006, C. Chu et al., "Alarm-Driven Access Control in an Enterprise Network."
Taylor, Nicholas R., "U.S. Appl. No. 11/444,861 Panel Decision Nov. 23, 2010", , Publisher: USPTO, Published in: US.
Taylor, Nicholas R., "U.S. Appl. No. 11/444,861 Examiner's Answer to Appeal Brief Feb. 28, 2011", , Publisher: USPTO, Published in: US.
Lewney, Dr. Mark, "GB Application No. GB0704920.8 Office Action May 28, 2010", , Publisher: UK IPO, Published in: GB.
Taylor, Nicholas R., "U.S. Appl. No. 11/444,861 Office Action Aug. 13, 2010", , Publisher: USPTO, Published in: US.
Taylor, Nicholas R., "U.S. Appl. No. 11/444,861 Advisory Action Oct. 21, 2010", , Publisher: USPTO, Published in: US.
Lewney, Dr. Mark, "GB Application No. GB0616895.9 Search Report Nov. 1, 2006", , Publisher: UK IPO, Published in: GB.
Maung, Zarni, "U.S. Appl. No. 11/294,961 2nd Notice of Allowance Jul. 6, 2009", , Publisher: USPTO, Published in: US.
Maung, Zarni, "U.S. Appl. No. 11/294,961 Notice of Allowance Feb. 27, 2009", , Publisher: USPTO, Published in: US.
Lewney, Dr. Mark, "GB Application No. GB0704920.8 Search Report Jul. 11, 2007", , Publisher: UK IPO, Published in: GB.
Taylor, Nicholas R., "U.S. Appl. No. 11/444,861 Office Action May 11, 2010", , Publisher: USPTO, Published in: US.

* cited by examiner

RESOURCE IDENTIFIER BASED ACCESS CONTROL IN AN ENTERPRISE NETWORK

RELATED APPLICATION

The present application is related to U.S. patent applications Ser. No. 11/294,961, filed Dec. 6, 2005 in the name of inventors A. W. Raphael et al. and entitled "Secure Gateway with Alarm Manager and Support for Inbound Federated Identity," and Ser. No. 11/444,861, filed Jun. 1, 2006 in the name of inventors C. Chu et al. and entitled "Alarm-Driven Access Control in an Enterprise Network," both of which are commonly assigned herewith and incorporated by reference herein.

FIELD OF THE INVENTION

The invention relates generally to the field of communication systems, and more particularly to techniques used to control access to internal resources of enterprise networks from external servers and other devices.

BACKGROUND OF THE INVENTION

Conventional techniques for controlling access to internal resources of enterprise networks from external servers and other devices may involve, for example, the use of secure sockets layer (SSL) virtual private network (VPN) gateways or other types of secure gateways.

A typical conventional SSL VPN gateway is configured to provide browser-based access to the internal resources of an enterprise network. Such internal resources may comprise servers, computers or other processing devices, from many different vendors, and running a wide variety of different protocols. Inbound transactions directed to the gateway are generally initiated using standard protocols such as hypertext transfer protocol (HTTP) or HTTP secure sockets (HTTPS). In a typical configuration, an SSL VPN gateway may not itself be a firewall, but may instead be located within the enterprise behind the firewall.

Examples of conventional SSL VPN gateways include the SA 700, SA 2000, SA 4000, SA 6000 and SA 6000 SP products commercially available from Juniper Networks, Inc. of Sunnyvale, Calif., USA, the EX-2500, EX-1500 and EX-750 products commercially available from Aventail Corp. of Seattle, Wash., USA, and the Permeo Base5 product commercially available from Permeo Technologies, Inc. of Austin, Tex., USA.

A significant drawback associated with conventional VPN gateways of the type listed above is that it can be difficult to handle alarms generated by internal resources of the enterprise. Such resources often comprise products from multiple vendors. Each vendor may have an external service provider that provides customer support for the products of that vendor. A given service provider may comprise, for example, technicians and expert systems that can process the alarms to resolve whatever problems may exist in the corresponding vendor products. Exemplary expert systems that may be used to process alarms are described in U.S. patent application Ser. No. 10/939,694, filed Sep. 13, 2004 in the name of inventors S. Ganesh et al. and entitled "Distributed Expert System for Automated Problem Resolution in a Communication System," which is commonly assigned herewith and incorporated by reference herein.

Generally, the conventional SSL VPN gateways are not configured to deliver alarms from multi-vendor products that are part of an enterprise network behind the firewall to their associated external service providers outside of the firewall, or to allow the service providers access to the products that generated the alarms. In many cases, a customer may have to call the service provider in order to let them know of a problem that has resulted in an alarm. The customer would then have to provide explicit authorization to allow a technician or expert system of the service provider to gain access to the product in order to resolve the problem.

Also, conventional SSL VPN gateways are typically designed to authenticate single users. It is impractical to authenticate the hundreds or even thousands of technicians that may be associated with the service providers that support the various multi-vendor products in a given enterprise. Service provider technicians may have to use hardware tokens or other similar mechanisms to obtain access to an enterprise network, and each service provider technician would have to use different sets of hardware tokens for each customer, which is impractical and expensive. Moreover, authenticating large pools of multi-vendor service provider technicians can place an excessive burden on the administration, authorization and authentication (AAA) server of a given enterprise, which is clearly undesirable.

The above-cited U.S. patent application Ser. No. 11/294, 961 discloses an improved SSL VPN gateway or other type of secure gateway which can provide more efficient handling of alarms from multi-vendor products that are part of the internal resources of an enterprise network.

In an illustrative embodiment, an SSL VPN gateway comprises an alarm manager and provides support for inbound federated identity. The alarm manager receives an alarm from a vendor product that is part of a set of internal resources of the enterprise network, and routes the alarm to an external service provider for processing. The gateway receives from the service provider, responsive to the alarm, a federated identity which encompasses a plurality of technicians, expert systems or other servicing elements of the service provider. The gateway may grant one or more particular servicing elements of the service provider access to the alarm-generating vendor product based on the federated identity.

The above-cited U.S. patent application Ser. No. 11/444, 861 discloses an alarm-driven access control approach in which an alarm access controller is operative to control access to an enterprise network of a communication system responsive to alarms generated by products that are part of a set of internal resources of the enterprise network. The alarm access controller is configured to receive an alarm from one of the products, to identify an external service provider for handling the alarm, and to provide temporary authenticated access of the service provider to the product.

Notwithstanding the considerable advantages provided by the techniques disclosed in the above-cited patent applications, a need remains for additional improvements, particularly with regard to further reducing implementation cost. For example, it would be desirable if alarm access control could be provided in a manner that avoids the need for a secure gateway or alarm access controller within the enterprise network.

SUMMARY OF THE INVENTION

The present invention in an illustrative embodiment provides a resource identifier based access control approach which does not require the use of a secure gateway or alarm access controller within the enterprise network. This advantageously reduces the costs associated with alarm access control in the enterprise network.

In one aspect of the invention, an entry in an authentication database of an enterprise network is activated responsive to generation of an alarm by a corresponding product that is part of a set of internal resources of the enterprise network. A dynamic uniform resource locator (URL) or other type of resource identifier based on the activated entry is supplied to an external service provider associated with the product. The external service provider is granted access to the product responsive to submission of the resource identifier by the service provider.

In an illustrative embodiment, the external service provider comprises a technician device, such as a computer or mobile communications device equipped with a browser, and the browser is operative to utilize the resource identifier to obtain access to the product. The resource identifier may have an associated user name and password which may be entered by the technician via the browser on the technician device.

The user entry may comprise a VPN user entry that is created upon installation of the product in the enterprise network but is normally in a deactivated state. Activation of such an entry indicates an authorized user of a VPN through which the product is accessible.

The resource identifier may be supplied from the enterprise network to a ticketing system of the external service provider, preferably in encrypted form. For example, the resource identifier may be encrypted using a public key of the product, with the external service provider having a corresponding private key for decrypting the encrypted resource identifier. The ticketing system of the external service provider generates a ticket for servicing the alarm and sends the ticket to a technician device along with the resource identifier.

After the alarm has been processed by the external service provider, the corresponding entry in the authentication database is deactivated, but remains available for subsequent reactivation in the event another alarm is generated by the same product.

The resource identifier may be a single-use URL which is disabled after a single access by the external service provider to the product. Duration, number of accesses or other characteristics of the resource identifier may also be specified.

These and other features and advantages of the present invention will become more readily apparent from the following drawings and detailed description.

DETAILED DESCRIPTION OF THE INVENTION

The invention will be described below in conjunction with an exemplary communication system comprising an enterprise network having a plurality of servers, computers or other processing elements. It should be understood, however, that the invention is not limited to use with any particular type of communication system or any particular configuration of servers, computers or other processing elements of the system. Those skilled in the art will recognize that the disclosed techniques may be used in any communication system application in which it is desirable to provide improved access responsive to internal alarms.

Figure 1:
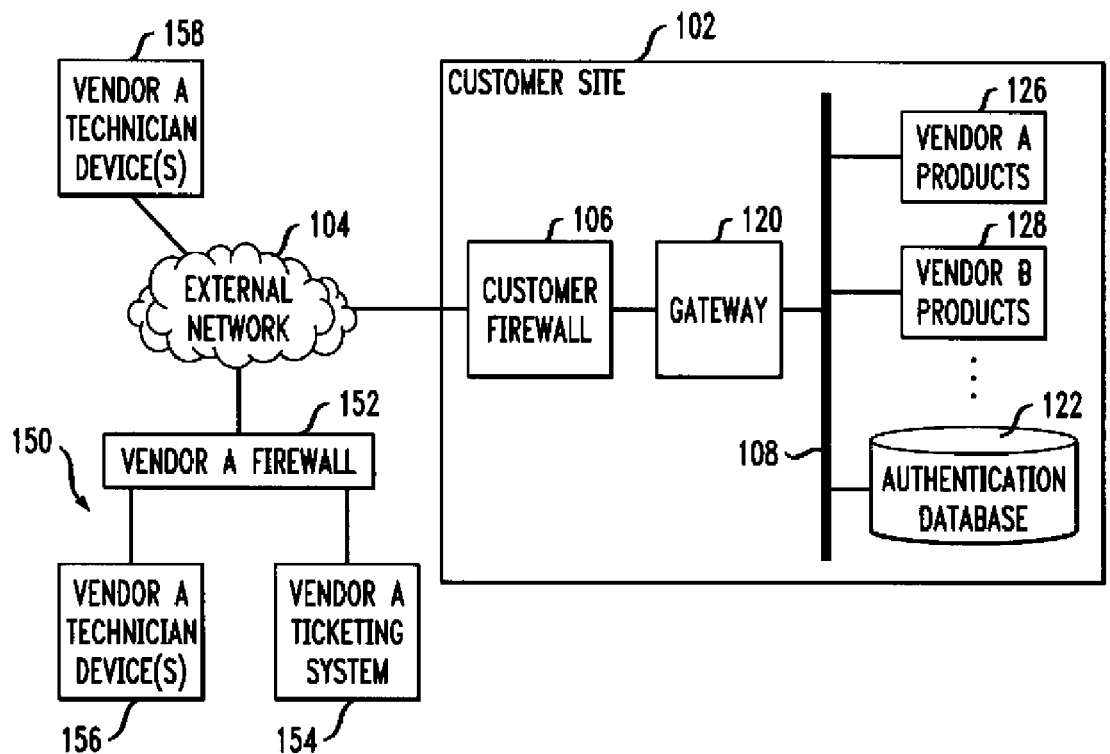
FIG. 1 shows an exemplary communication system with resource identifier based alarm access control in accordance with an illustrative embodiment of the invention.

FIG. 1 shows an example of a communication system 100 in accordance with an illustrative embodiment of the invention. The system 100 comprises a customer site 102 which is coupled to an external network 104. The customer site 102 comprises an enterprise network that is separated from the network 104 via a firewall 106. The enterprise network in this embodiment comprises one or more network segments 108, which may comprise local area network (LAN) segments, wide area network (WAN) segments, or other network segments, or portions thereof, in any combination. The one or more network segments 108 are coupled to a gateway 120.

The gateway 120 may comprise, for example, a VPN gateway that utilizes otherwise conventional VPN tunnels. Such a VPN gateway may incorporate one or more features of an SSL VPN gateway or other secure gateway of the type described in the above-cited U.S. patent application Ser. No. 11/294,961, although the present invention does not require such features. As another example, the gateway 120 may comprise a service provider gateway providing external service provider access via HTTPS. Such a service provider gateway may be configured to terminate or otherwise process HTTPS requests in a conventional manner. In still other embodiments, the gateway 120 may be replaced with a conventional router or other type of network switching element.

Although not shown in the figure, one or more support servers may be coupled to the gateway 120. Such support servers may comprise, for example, a network management system (NMS) server, an AAA server, a system log (Syslog) server, etc. These various servers may be implemented in a single computer or other processing element, or each may comprise a separate, stand-alone processing element or a set of such elements.

Also coupled to the one or more network segments 108 is an authentication database 122. This database may be part of a larger authentication system, not specifically shown, which may itself comprise one or more otherwise conventional servers such as the above-noted AAA server. The manner in which the authentication database operates will be described in greater detail below with reference to the flow diagram of FIG. 3.

The enterprise network in the present embodiment further comprises one or more servers or other processing elements 126 and 128. Elements 126 represent computers, servers or other processing elements that are products of a particular vendor denoted as Vendor A. Similarly, elements 128 represent computers, servers or other processing elements that are products of a particular vendor denoted as Vendor B. In the present embodiment, such Vendor A or Vendor B products may further comprise, for example, so-called adjunct products that are not manufactured or otherwise supplied by respective Vendor A or Vendor B, but are supported by that vendor.

The term "product" as used herein is intended to be construed broadly so as to encompass, by way of example, computers, servers or other processing elements as noted above. Such other processing elements may comprise, for example, switches, gateways, routers, firewalls, etc. A given processing element may be, for example, a self-contained piece of equipment, a component of such a piece of equipment, or a combination of multiple such pieces of equipment, and may comprise software, hardware and/or firmware in any combination.

Although not explicitly shown in this example, additional products that are the products of the customer itself, or of numerous other vendors, may also be part of the enterprise network. As another example, all or substantially all of the products within a given enterprise network may be products of only a single vendor. Many other arrangements of products within an enterprise network are possible in a given embodiment of the invention.

The enterprise network associated with customer site 102 in the present embodiment thus has internal resources comprising multi-vendor products 126 and 128. The products 126 and 128 are coupled to the one or more enterprise network segments 108 as shown.

It should be noted that the term "customer" as used in the context of the illustrative embodiment refers to an enterprise that purchases or otherwise obtains products 126 and 128 from respective vendors A and B, and that may also use one or more of its own products, as well as products from other vendors. Thus, the entity denoted as the customer in this embodiment is a customer of at least the vendors A and B. It is to be appreciated that the invention does not require such a customer arrangement, but is more generally applicable to any business, organization or other enterprise that has internal resources for which external access is controlled responsive to generated alarms as described herein.

Also, it is to be appreciated that a given processing element of the system 100 may itself comprise multiple vendor products. Thus, a given vendor product, as that term is used herein, may comprise, for example, a particular portion of a given processing element, such as a software program running on that element, a hardware component of that element, etc.

The various devices of the customer site 102 need not all be at the same physical facility location. For example, the site may be a distributed site, with certain of the devices being located at different physical facilities.

The external network 104 in this embodiment may represent, for example, a network supporting Internet and Frame Relay protocols, although other protocols can of course be utilized in implementing the invention. A given external or enterprise network in an embodiment of the invention may comprise, by way of example, a global communication network such as the Internet, an intranet, an extranet, a LAN, a WAN, a metropolitan area network (MAN), a wireless cellular network, or a satellite network, as well as portions or combinations of these or other wired or wireless communication networks. Implementation of the present invention thus does not require any particular type of network or set of networks.

The external network 104 is coupled to service provider 150 associated with Vendor A. The service provider 150 may also be referred to herein as a third-party service provider, since it may constitute entities that are separate from the customer or the product vendors. However, the invention does not require any particular relationship among the customer, service providers and vendors, and the techniques described herein can be adapted in a straightforward manner for application to other types of entities.

Service provider 150 comprises a firewall 152 behind which are located a Vendor A ticketing system 154 and one or more Vendor A technician devices 156. The service provider may also comprise other elements, such as one or more expert systems of the type described in the above-cited U.S. patent application Ser. No. 10/939,694. Also assumed to be part of the service provider 150 in the present embodiment are remote Vendor A technician devices 158, which are directly coupled to network 104. The technician devices 156 and 158 may comprise, for example, computers, mobile communications devices, etc. which may be used to allow technicians to communicate with customer site 102. As another example, one or more of the technician devices 156 and 158 may comprise SSL client devices of a remote customer technician, coupled to the external network 104 via respective SSL VPNs.

As will be described in greater detail below, the service provider 150 is configured to respond to alarms generated by the Vendor A products 126, by accessing said products via the router 120 using resource identifiers supplied by the authentication database or an associated authentication system of enterprise network 102. The access may be made by one of the associated technician devices 156 or 158, using information supplied by the Vendor A ticketing system 154, as will be described.

Although not shown in the figure, a similar service provider configuration may be provided for Vendor B, comprising, by way of example, Vendor B technician devices and a Vendor B ticketing system. A given Vendor B technician device may be located behind a Vendor B firewall, or may be directly connected to the network 104.

Such service providers may each have a corresponding federated identity associated therewith, as described in the above-cited U.S. patent application Ser. No. 11/294,961. It is to be appreciated, however, that federated identity is not a requirement of the invention, and need not be used in a given embodiment.

The devices 120, 122, 126, 128, 154, 156 and 158 of system 100 are examples of what are more generally referred to herein as "processing elements."

Figure 2:
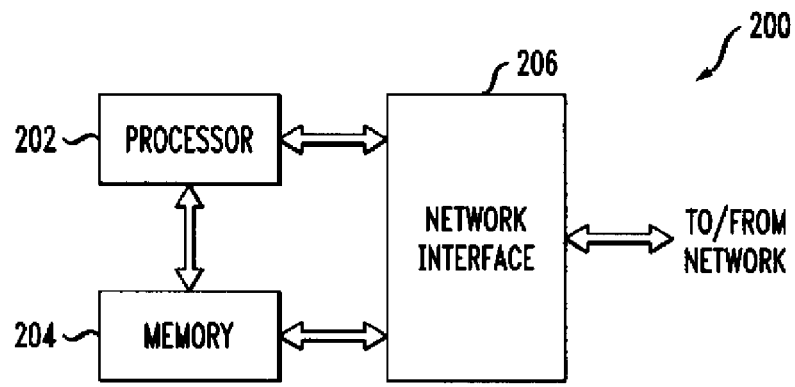
FIG. 2 is a simplified block diagram showing one possible implementation of a given processing element of the FIG. 1 system.

FIG. 2 shows a simplified block diagram of one possible implementation of a given processing element 200 of the FIG. 1 system. The processing element 200 may correspond, by way of example, to the gateway 120, to the authentication database 122, to one of the products 126 or 128, or to an element of service provider 150, such as ticketing system 154 or technician devices 156 or 158. Generally, any such processing element comprises a processor 202 coupled to a memory 204 and one or more network interfaces 206. The techniques of the present invention may be implemented at least in part in the form of software storable in the memory 204 and executable by the processor 202. The memory 204 may represent random access memory (RAM), read-only memory (ROM), optical or magnetic disk-based storage, or other storage elements, as well as portions or combinations thereof.

Those skilled in the art will recognize that the individual components of FIG. 2 as shown for illustrative purposes may be combined into or distributed across one or more processing devices, e.g., a microprocessor, an application-specific integrated circuit (ASIC), a computer or other device(s).

In addition, depending on which of the system devices it implements, the processing element 200 may further include additional components that are not shown in the figure but are typically associated with such a device. For example, a given processing element 200 implementing one or more of devices 120, 122, 126 or 128 may comprise, for example, additional components commonly associated with an otherwise conventional computer, a server, a set of servers, etc. As another example, a given processing element 200 implementing one or more of the technician devices 156 or 158 may comprise additional components commonly associated with an otherwise conventional mobile communication device such as a mobile telephone, personal digital assistant (PDA) or portable computer, or an otherwise conventional non-mobile communication device, such as a desktop computer, a server or a set of servers, or more generally any other type of processor-based device or set of devices suitably configured for communication with other devices of system 100. The conventional aspects of these and other devices utilizable in system 100 are well known in the art and therefore not described in further detail herein.

The system 100 may include additional elements not explicitly shown in the figure, such as additional servers, routers, gateways or other network elements. The system may also or alternatively include one or more communication system switches, such as a DEFINITY® Enterprise Communication Service (ECS) communication system switch available from Avaya Inc. of Basking Ridge, N.J., USA. As another example, a given communication switch utilizable in conjunction with the present invention may comprise Multi-Vantage™ communication system software, also available from Avaya Inc. The term "processing element" as used herein is intended to include such switches, as well as servers, routers, gateways or other network elements.

It is therefore to be appreciated that the present invention does not require the particular arrangements shown in FIG. 1, and numerous alternative configurations suitable for providing resource identifier based access control and other functionality described herein will be readily apparent to those skilled in the art.

The customer site 102 is configured in the illustrative embodiment to provide improved processing of alarms generated by the products 126 and 128, without requiring a secure gateway or alarm access controller within the enterprise network. This approach advantageously reduces the costs associated with managing external service provider access responsive to product alarms at the customer site.

In operation, the customer site 102 temporarily activates an entry in the authentication database 122 responsive to generation of an alarm by a given one of the products 126 or 128. The activation may be responsive to a request from the alarm-generating product or another system element at the customer site. The entry in the illustrative embodiment comprises a VPN user entry indicating an authorized user of a VPN through which the product is accessible via gateway 120, although other types of entries could be used in other embodiments. The authentication database or an associated authentication system supplies a dynamic uniform resource locator (URL) or other resource identifier based on the activated entry to an external service provider associated with the product, for example, to Vendor A service provider 150 if the alarm originated from one of the Vendor A products 126. The ticketing system 154 of the external service provider 150 may generate a ticket for servicing the alarm and send the ticket to a technician device 156 or 158 along with the resource identifier.

The external service provider is then granted access to the product responsive to submission of the resource identifier by the service provider. For example, the ticketing system 154 may supply a dynamic URL received from customer site 102 to one of the Vendor A technician devices 156 or 158, and the corresponding technician uses a browser running on the device to enter the URL and an associated user name and password to obtain temporary access to the alarm-generating product. For security purposes, the dynamic URL and its associated user name and password are preferably supplied from the customer site 102 to the ticketing system 154 in an encrypted form. Such encryption may make use of well-known public key cryptography techniques, with the dynamic URL and its associated user name and password being encrypted using a public key of the particular product that generated the alarm. The corresponding service provider has access to a counterpart private key that can be used to decrypt the encrypted dynamic URL and its associated user name and password.

Figure 3:
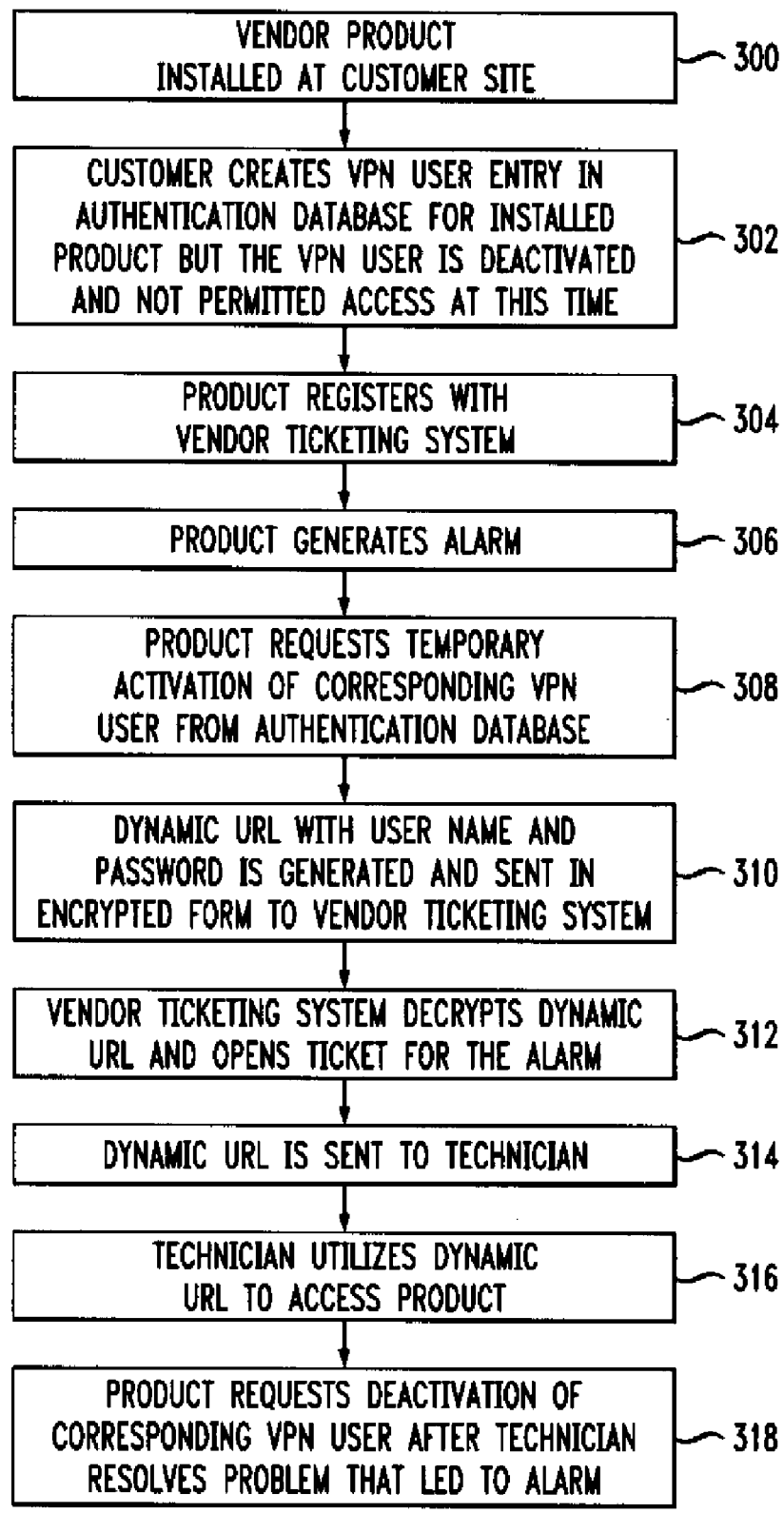
FIG. 3 is a flow diagram showing one example of a resource identifier based alarm access control process that may be implemented in the FIG. 1 system in the illustrative embodiment of the invention.

An example of the processing of a given alarm in the system 100 will now be described in greater detail with reference to the flow diagram of FIG. 3. It should be understood, however, that other types of alarm processing may be used in other embodiments.

In step 300, a vendor product is installed at the customer site 102. It will be assumed for illustrative purposes that the installed product is a particular Vendor A product 126, with servicing for alarms generated by the product being provided by the external Vendor A service provider 150. The installed product is coupled to a LAN or other network segment 108 at the customer site 102, and has a public key associated therewith. The corresponding private key is held by the Vendor A service provider.

In step 302, the customer creates a VPN user entry in the authentication database 122 for the installed product. The user entry may be created by a system administrator, or automatically in response to connection of the product to the network segment, or using other techniques. This particular user entry is to be activated only when an alarm is generated by the corresponding product 126, and typically only for a limited duration sufficient to resolve the problem that led to generation of the alarm. Thus, at the time of creation of the entry in step 302, the VPN user is typically deactivated and not permitted access. As noted above, other types of authentication database entries may be used in practicing the invention.

It should be noted that the authentication database may be implemented as any type of memory or other machine-readable storage medium configured for storage of VPN user entries or other authentication information. For example, it may comprise a designated portion of a memory of a given processing element of the system. As noted previously, authentication database 122 may be implemented as a processing element, as well as a portion of such an element or combinations of such elements.

In step 304, the product 126 registers with the Vendor A ticketing system 154.

In step 306, an alarm is generated by the product 126. The product then requests temporary activation of the corresponding VPN user from the authentication database 122, as indicated in step 308. In response to the request, a dynamic URL with a user name and password is generated and sent in encrypted form to the Vendor A ticketing system 154 as shown in step 310. The dynamic URL, which is an example of what is more generally referred to herein as a "resource identifier," may be generated by the authentication database 122 or an associated authentication system. Alternatively, the dynamic URL may be generated by another system element at the customer site 102, such as the alarm-generating product 126. The dynamic URL and its associated user name and password may be encrypted into a single file using the public key of the product 126 and sent to the Vendor A ticketing system 154. In other embodiments, multiple files may be used for different portions of the resource identifier, other types of encryption may be used, etc.

In step 312, the Vendor A ticketing system 154 utilizes the private key of the alarm-generating product to decrypt the above-noted file containing the dynamic URL and its user name and password. The ticketing system also opens a trouble ticket for the alarm. The dynamic URL may be incorporated into the ticket. In any case, the dynamic URL is sent, preferably with the ticket, to a particular one of the technician devices 156 and 158 that is assigned to handle the alarm, as indicated in step 314.

In step 316, the technician associated with the technician device 156 or 158 receives the dynamic URL and the ticket, and utilizes the dynamic URL to access the product 126 via the gateway 120. The dynamic URL and the associated user name and password allow the technician to obtain immediate access through customer firewall 106 to the product 126 in order to resolve the issue that led to the alarm. The technician can use an otherwise conventional web browser, or other access device or mechanism, to gain access to the alarm-generating product via the gateway 120. In other embodiments, other service elements associated with the service provider 150 may be used to service the alarm using the dynamic URL. For example, an expert system, not shown in the figures, may be used in place of or in conjunction with a technician to access the alarm-generating product.

In the illustrative embodiment, the system may be configured such that a given dynamic URL generally can only be used once. That is, once the alarm-generating product receives the first request for connection using the dynamic URL, the URL may be deactivated so that it cannot be used again. Alternatively, a limited number of accesses may be specified for a given dynamic URL, in case a technician may be require multiple accesses to resolve the problem. The total duration or other characteristics of the authorized access(es) may also be specified.

A given access to customer site 102 by a Vendor A technician via one of the devices 156 or 158 may be logged by the gateway 120 or another customer site element along with the alarm information and a corresponding ticket number.

When the ticket is closed, the alarm-generating product 126 may receive an "alarm clear" message from the ticketing system 154. The VPN user entry that was temporarily activated in step 308 may then be deactivated, for example, responsive to a request by the product 126, as indicated in step 318 of the FIG. 3 flow diagram. Such a request may be directed to a system administrator, to an authentication system associated with the authentication database, or to another customer site element. Other indications of problem resolution, for example, a message received from a technician servicing the alarm, or the cessation of the alarm responsive to servicing by a technician, may be used to trigger deactivation of the VPN user entry. The entry remains available for subsequent re-activation responsive to generation of another alarm by the same product. The gateway 106 or other customer site element may log when a given period of authorized access to the enterprise network ends.

One or more of the processing functions described above in conjunction with the illustrative embodiments of the invention may be implemented in whole or in part in software utilizing processor 202 and memory 204 associated with one or more processing elements of the system. Other suitable arrangements of hardware, firmware or software may be used to implement the techniques of the invention.

It should again be emphasized that the above-described arrangements are illustrative only. Thus, it is to be appreciated that the particular system elements, processing operations and other features shown in the figures are presented by way of example only, and should not be viewed as requirements of the invention. For example, alternative embodiments may utilize different processing element configurations and different processing operations than those of the illustrative embodiments. These and numerous other alternative embodiments within the scope of the following claims will be apparent to those skilled in the art.

What is claimed is:

1. A method comprising:
   (a) receiving by a database an entry that is associated with a product, wherein an enterprise network comprises the database and the product and wherein the database operates independently of whether the enterprise network comprises at least one of a secure gateway and an alarm access controller, and wherein the entry is inactive;
   (b) in response to the product in the enterprise network generating an alarm:
      (I) activating the entry in the database, and
      (II) transmitting to a resource that is external to the enterprise network a resource-identifier that is based on (i) the identity of the product and (ii) the activated entry, wherein the resource-identifier comprises a dynamic uniform resource locator (URL), a username, and a password for the resource to access the product;
   (c) when the entry in the database is active, granting by the enterprise network to the resource access to the product based on the resource-identifier; and
   (d) when the entry in the database is inactive, denying to the resource access to the product.

2. The method of claim 1 wherein the entry comprises data for accessing the enterprise network over a virtual private network.

3. The method of claim 1 wherein the resource-identifier comprises an encrypted dynamic uniform resource locator (URL) for the resource to access the product.

4. The method of claim 1 further comprising:
   granting access to the product for a ticketing system of the resource when the enterprise network receives the resource-identifier from the ticketing system.

5. The method of claim 1 further comprising:
   deactivating the entry in the database in response to the alarm having been processed.

6. The method of claim 1 further comprising:
   disabling the resource-identifier after a single use.

7. The method of claim 1 wherein the entry is received from the product.

8. A system comprising:
   an enterprise network that comprises a product and a database, wherein the enterprise network controls external access to the product from a resource that is external to the enterprise network, and wherein the database operates independently of whether the enterprise network comprises at least one of a secure gateway and an alarm access controller;
   an entry in the database, wherein the entry is inactive, and wherein the entry is activated responsive to the product generating an alarm;
   a resource-identifier based on (i) the identity of the product and (ii) the activated entry, wherein the resource-identifier is generated responsive to the entry being activated and wherein the resource-identifier comprises a dynamic uniform resource locator (URL), a username, and a password for the resource to access the product; and
   when the entry is active, access to the product granted by the enterprise network to the resource that is external, wherein the access is based on (i) the activated entry in the database and (ii) the enterprise network receiving the resource-identifier from the resource.

9. The system of claim 8 wherein the entry comprises data for accessing the enterprise network over a virtual private network.

10. The system of claim 8 wherein the resource-identifier used by the external service provider comprises an encrypted dynamic uniform resource locator (URL) for the resource to access the product.

11. The system of claim 8 wherein the access to the product is granted to a ticketing system of the resource when the ticketing system uses the resource-identifier.

12. The system of claim 8 wherein the entry in the database is deactivated responsive to the alarm having been processed.

13. The system of claim 8 wherein the resource-identifier is disabled after a single use.

14. The method of claim 8 wherein the entry is received from the product.

* * * * *